United States Patent
Wilson et al.

(10) Patent No.: US 7,455,223 B1
(45) Date of Patent: Nov. 25, 2008

(54) RFID-BASED METHOD FOR A NETWORKED CASHLESS VENDING SYSTEM

(75) Inventors: David N. Wilson, Greenville, SC (US); Donald R. Congdon, Greer, SC (US); James A. Knisely, Greer, SC (US)

(73) Assignee: Bob Jones University, Greenville, SC (US)

( * ) Notice: Subject to any disclaimer, the term of this patent is extended or adjusted under 35 U.S.C. 154(b) by 542 days.

(21) Appl. No.: 11/214,570

(22) Filed: Aug. 29, 2005

(51) Int. Cl.
G06K 7/08 (2006.01)
(52) U.S. Cl. .......................... 235/381; 235/383; 221/9; 222/2; 700/231; 700/237; 700/241; 700/244
(58) Field of Classification Search ................ 235/381, 235/383; 221/9; 222/2; 700/231–244
See application file for complete search history.

(56) References Cited

U.S. PATENT DOCUMENTS

| | | | |
|---|---|---|---|
| 6,056,194 A | 5/2000 | Kolls | |
| 6,230,150 B1 | 5/2001 | Walker et al. | |
| 6,321,985 B1 * | 11/2001 | Kolls | 235/381 |
| 6,457,038 B1 | 9/2002 | Defosse | |
| 6,684,200 B1 | 1/2004 | Koga | |
| 6,757,585 B2 | 6/2004 | Ohtsuki et al. | |
| 6,764,003 B1 | 7/2004 | Martschitsch | |
| 2002/0026366 A1 | 2/2002 | Ohtsuki et al. | |
| 2002/0072976 A1 | 6/2002 | Virtanen et al. | |
| 2002/0099662 A1 | 7/2002 | Joshi | |
| 2002/0161598 A1 | 10/2002 | Kim | |
| 2002/0165788 A1 | 11/2002 | Bates et al. | |
| 2002/0194387 A1 * | 12/2002 | Defosse | 709/251 |
| 2003/0023509 A1 | 1/2003 | Ramming | |
| 2003/0158891 A1 | 8/2003 | Lei et al. | |
| 2004/0133653 A1 * | 7/2004 | Defosse et al. | 709/217 |
| 2004/0210486 A1 | 10/2004 | Carapelli | |
| 2004/0249711 A1 | 12/2004 | Walker et al. | |
| 2005/0010434 A1 | 1/2005 | Sasajima et al. | |
| 2005/0096936 A1 | 5/2005 | Lambers | |
| 2005/0102233 A1 | 5/2005 | Park et al. | |

OTHER PUBLICATIONS

"Migrating NetVend to .net" by Mark Nichols; http; llinnovexpo.itee.uq.edu.au120031exhibitsls3631361thesis.pdf; a 122 page thesis, 2005.
Michael L. Kasavana; NAMA White Paper: Cahsless Vending; Michigan State University; Chicago, Illinois, 2005.

* cited by examiner

*Primary Examiner*—Michael G Lee
*Assistant Examiner*—Ali Sharifzada
(74) *Attorney, Agent, or Firm*—Bowman Green Hampton & Kelly, PLLC (57) ABSTRACT

A cashless vending system, comprising, a plurality of vending machines, wherein each vending machine comprises a Vending Machine Controller that supports the international Multi-Drop Bus/Internal Communication Protocol standard; wherein each vending machine includes a NetVend interface, wherein each NetVend interface communicates, via a Multi-Drop Bus/Internal Communication Protocol interface, with the Vending Machine Controller; wherein each NetVend interface communicates with at least one central server, wherein the central server contains a database for storing user Identifiers and an associated allowable credit or available cash data for each user Identifier, wherein the central server is capable of authenticating users for granting/denying access to a vending machine, receiving transaction data, and monitoring and controlling each of the plurality of vending machines; and wherein each vending machine includes a display/reader.

2 Claims, 9 Drawing Sheets

RFID-BASED METHOD FOR A NETWORKED CASHLESS VENDING SYSTEM

BACKGROUND OF THE INVENTION

1. Field of the Invention

This invention relates generally to systems, methods, and apparatuses for cashless vending. In particular, the present invention relates to a RFID-based method for a secure and reliable, networked cashless vending system.

2. Description of Related Art

Both vending companies and end-users have become increasingly interested in methods of cashless vending designed to reduce or eliminate dependence upon cash for vending transactions. Broadly speaking, current cashless vending systems fall into two categories: debit (i.e. stored value) and credit systems.

Most debit systems rely on the user's carrying actual cash value stored in an electronic form such as a magnetic stripe card or other pre-paid accessed memory device. Vending machines read the stored value and permit a vend to occur provided sufficient cash is present in the authentication device. The advantage of such systems is that they do not require any kind of user account authentication system in the vending machine, nor do they require the user to be registered with the vending provider or with a financial institution. The disadvantage of such systems is that they require the user to carry actual cash value in his possession, making him open to loss or theft. Furthermore, stored value systems do not allow the vending provider a means of remotely monitoring or controlling the vending machines.

Credit systems also require the user to carry some form of access device such as a magnetic stripe card or other similar device, but the device does not contain stored value. Instead, it contains a user ID that must be authenticated remotely with some kind of authentication service such as a bank or credit card company or the vending provider itself. Credit systems have the advantage that the user does not carry actual cash value. A lost or stolen authentication device can be quickly disabled by the authentication service, thereby minimizing financial loss to the user. Furthermore, since available funds are stored remotely, user payment and account management is much more flexible and simple.

Since credit systems must include some kind of communications system linking the vending machine to the authentication service, they offer the possibility of remote management and monitoring. The vending provider can monitor purchases for inventory and planning purposes, and problem vending machines can be detected and shut down quickly without an actual human presence at the machine location.

Credit systems have the disadvantage that users cannot access the system unless they have an account with the authentication service. The vending machines themselves must be connected to the authentication service either through a wired (e.g. dialup or local area network) or wireless (e.g. cellular or wireless local area network) communications system. Data security and reliability of authentication and transaction data become critical to prevent revenue loss to the vending provider and user data theft.

SUMMARY OF THE INVENTION

This invention relates generally to systems, methods, and apparatuses for cashless vending. More particularly, the present invention relates to systems, methods, and apparatuses for providing user access to a cashless vending system through Radio Frequency Identification (RFID) authentication as well as monitoring and controlling vending machines from a central control point using a variety of techniques to ensure security and integrity of authentication, transaction, control, and monitoring data.

A RFID-based method for a secure and reliable networked cashless vending system is disclosed. In various exemplary, non-limiting embodiments, a plurality of vending devices are interfaced through local and/or wide-area networks to a central authentication, transaction, and management server that controls and monitors the system. Transactions are secured through data encryption and the system uses a variety of techniques to ensure reliable transactions to the transaction server. Remote management and monitoring of both vending machines and the database server are possible through, for example, a web-based application interface, and automatic email notification.

In one exemplary, non-limiting embodiment, the system controls and monitors a plurality of networked vending machines from a central location server in three key ways. First, the system authenticates customers via a RFID identity card and either grants or denies access to the vending machine. Second, the system receives and stores in the central server transaction information after a purchase. Third, the system allows the vending provider to monitor and control the vending machines as well as manage user accounts, transaction history, and remote billing through the central server's resources.

In one exemplary, non-limiting embodiment, the system comprises a plurality of vending machines offering products for sale. Each vending machine contains a Vending Machine Controller (VMC) that supports the international vending interface standard known as Multi-Drop Bus/Internal Communication Protocol (MDB/ICP).

In various exemplary embodiments, each vending machine contains a vending machine interface, known as NetVend, which connects to the VMC through its MDB interface. The NetVend device appears to the VMC as a Cashless Device #1 as defined in the MDB/ICP 3.0 specifications document. The NetVend interface 114 communicates with the VMC, with the user via a display/reader combination, and with the network by which it authenticates users, transmits transaction information, provides monitoring information, and receives enable/disable signals.

In various exemplary, non-limiting embodiments, all communications occur in an encrypted format, thereby protecting data integrity and reducing the likelihood of malicious tampering or identity theft. Furthermore, the NetVend device contains non-volatile memory so transactions can be preserved in the event of a network interruption or power loss. Each NetVend device has an embedded ID number to uniquely identity it to the central server.

In various exemplary embodiments, each vending machine contains a user interface known as the display/reader. This device reads the user's RFID card and provides visual as well as audible prompts via, for example, an alphanumeric display, a bi-color LED, and a beeper.

In various exemplary embodiments, each NetVend device connects to a local area network (LAN) that may, in turn, be connected by appropriate routers and gateways to other local area networks, wide area networks (WANs), or the Internet. This network links all vending machines to a central server that provides authentication, transaction reception, monitoring, and control for the individual vending machines. The NetVend devices may connect to any wired network supporting the 100/10BASE-T standards (i.e. Ethernet) or to any wireless network supporting, for example, the 802.11b/g standard. With appropriate routers and gateways, they may, in turn, communicate with any type of network that supports the Transmission Control Protocol/Internet Protocol (TCP/IP) protocol.

In various exemplary embodiments, each vending machine communicates, via the network, to a central server that provides several essential services, such as, for example, a database of authorized users as well as their current financial status with the service; debit or credit style access; authentication of authorized users and transmission of account status to the display/reader on the vending machine; reception of transaction information (i.e. customer identity number, purchase value, and item number); monitoring of regular "aliveness" signals sent from each vending machine interface with display on a web-accessible monitoring application as well as automatic email notification in the event of machine problems; management of customer accounts, display of transaction history, and posting to billing systems; and an ability to enable/disable cashless access on any vending machine in the event that such an action becomes desirable.

Accordingly, this invention provides systems, methods, and apparatuses, which provides user access to a cashless vending system through RFID authentication.

This invention separately provides systems, methods, and apparatuses, which monitor and control vending machines from a central control point.

This invention separately provides systems, methods, and apparatuses, which can be used to ensure security and integrity of authentication, transaction, control, and monitoring data in a cashless vending system.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF AN EXEMPLARY EMBODIMENT

Before describing variations of the present invention in detail, it is to be understood that this invention is not limited to particular variations set forth and may, of course, vary. Various changes may be made to the invention described and equivalents may be substituted without departing from the true spirit and scope of the invention.

For simplicity and clarification, the design factors and principles of the systems, methods, and apparatuses of this invention are explained with reference to various exemplary embodiments of systems, methods, and apparatuses of this invention. The basic explanation of the design factors and operating principles of the systems, methods, and apparatuses is applicable for the understanding, design, and operation of the systems, methods, and apparatuses of this invention.

Figure 1:
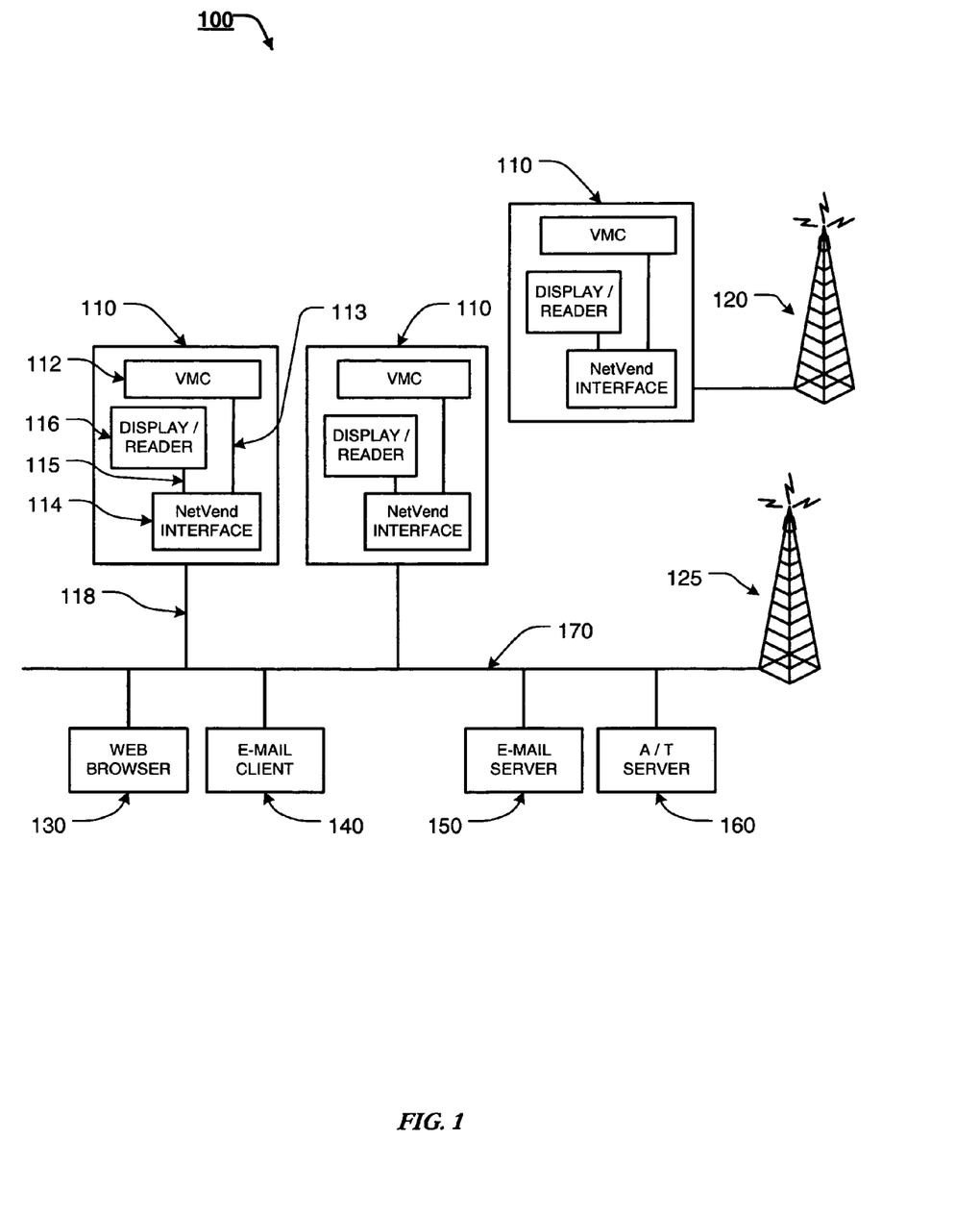
FIG. 1 shows a block diagram of a first exemplary embodiment of a cashless vending system according to this invention.

Turning now to FIG. 1, FIG. 1 shows a block diagram of a first exemplary embodiment of a cashless vending system 100 according to this invention. As shown in FIG. 1, the cashless vending system 100 is an RFID-based, networked, cashless, vending system 100. The system 100 comprises a plurality of vending machines 110.

Each vending machine 110 comprises a Vending Machine Controller (VMC) 112 that supports the international MDB/ICP standard. Each vending machine 110 may also contain traditional cash devices (i.e. coin and bill acceptors) if desired as these can work alongside the invention described herein.

Each vending machine 110 includes a NetVend interface 114 that implements the core components of the invention, as described herein. It should be appreciated that the NetVend interface 114 may be a part of the original equipment of the vending machine 110 or may be a retrofitted piece of equipment on the vending machine 110.

The NetVend interface 114 communicates, via the MDB/ICP interface 113, with the VMC 112 and appears to the VMC 112 as a Cashless Device #1 as defined in the MDB/ICP 3.0 specifications document. Each NetVend interface 114 contains an embedded machine ID number that uniquely identifies each vending machine 110.

The NetVend interface 114 also communicates with the user via the display/reader 116, as further described herein. The reader portion of the display/reader 116 scans the user's RFID card and the display portion of the display/reader 116 prompts the user through its display, LED, and audible signals.

The NetVend interface 114 communicates with the central server 160, via interface 118. In various exemplary embodiments, the NetVend interface 114 interfaces, for example, with the central server 160, via a wireless link using the at least one transmitter 120 and at least one receiver 125. Alternatively, the NetVend interface 114 can interface with the central server 160, either directly or indirectly, via any linked connection. The linked connection can be any known or later developed device or system for connecting the NetVend interface 114 to the central server 160, including a direct wired connection, a connection over a Local Area Network (LAN), a Wide Area Network (WAN), or any other distributed network, a connection over the public switched telephone network, a connection over a coaxial cable (i.e., CATV) system, a connection over a cellular telephone network, a very high frequency (VHF) connection, an ultra high frequency (UHF) connection, a radio frequency (RF) connection, a satellite connection, or the like. In general, the linked connection can be any known or later developed connection system or structure usable to connect the NetVend interface 114 to the central server 160, including both wired and wireless connections.

Furthermore, the email client 140 communicates with the email server 150, while the email server 150 and the web browser 130 each communicate with the central server 160, via wired and wireless connections.

In various exemplary, non-limiting embodiments, the wired interface supports the 100/10BASE-T (i.e. Ethernet) standard and may be connected to any LAN that supports this standard. The wireless interface supports the 802.11b/g standard and may talk to a LAN via a wireless router/gateway. In various exemplary, non-limiting embodiments, communications occur using the TCP/IP protocol, making NetVend communications available to almost any kind of network up to and including the Internet. In various exemplary embodiments, the NetVend communications are encrypted to maximize data security and to reduce the possibility of tampering.

The LAN 170 is shown as a 100/10BASE-T network, but NetVend communications can also be carried over other types of networks if suitable gateways and routers are available. The system 100 may therefore work over multiple LANs, WANs, or the Internet.

In various exemplary embodiments, the at least one transmitter 120 is, for example, a VHF transmitter, a UHF transmitter, a RF transmitter, a satellite transmitter, or the like. When the at least one transmitter 120 is, for example, a satellite transmitter, the at least one transmitter 120 operates in conjunction with at least one satellite (not shown). Thus, in various exemplary embodiments, the receiver 125 includes at least one of an appropriate VHF antenna, a UHF antenna, a RF antenna, a satellite communications receiver, or the like.

In various exemplary, non-limiting embodiments, the central server 160 performs three critical functions. The central server 160 authenticates users for granting/denying access to the vending machine 110, receives transaction data, and monitors and controls individual vending machines 110. The central server 160 contains a database of user Identifiers (IDs) along with their associated allowable credit (credit mode) or available cash (debit mode).

During use of the system 100, individual vending machines 110 contact the central server 160 by sending a user's RFID number to the central server 160. When a user's RFID number is sent to the central server 160, the vending machine 110 awaits authentication from the server.

When a user's RFID number is received by the central server 160, the central server 160 reviews the database for the received user's RFID number and determines the allowable credit or available cash associated with the received user's RFID number.

Then, based on the allowable credit or available cash associated with the received user's RFID number, the central server 160 either grants or denies the user access to the vending machine 110.

Users who are granted access to the vending machine 110 are shown their available credit/cash on the display/reader 116 and may make a purchase. Users who are denied access may make purchases with cash if cash-accepting devices are present in the machine. Cash-based access may therefore act as a fallback option for unauthorized users or for continued vending in the event of disabled cashless service.

When the central server 160 grants a user access to the vending machine 110, the central server 160 sends a transaction ID number to the vending machine 110 that will be used after a completed vend. In various exemplary embodiments, all of the authentication data is encrypted for security purposes.

After the vending machine 110 has granted the user access, the user may select a product, cancel the transaction, or allow the session time out. When the user has made a selection, canceled the transaction, or allowed the session time out, the vending machine 110 sends transaction data to the central server 160. In various exemplary embodiments, the transaction data includes at least some of the vending machine 110 ID, transaction ID, the purchase value, and the item number for the purchased item.

When the transaction data has been received by the central server 160, the central server 160 sends an acknowledgement to the vending machine 110. The vending machine 110 must receive a proper acknowledgement before the vending machine 110 will permit another cashless vend. In various exemplary embodiments, all of the transaction data is encrypted for security purposes.

The item number that is included with of the transaction data may be used in conjunction with an inventory database (not shown) to implement automatic inventory control and monitoring. In this manner, a vending provider will know which items are selling well and which are selling poorly. Re-filling the vending machines 110 will be easier and more efficient since only items that are sold out or nearly sold out need be dispatched to a given vending machine 110.

In various exemplary embodiments, the central server 160 monitors each vending machine 110 for the "aliveness" signals that the vending machine 110 transmits at a predetermined time interval, such as, for example, once every minute. When the central server 160 receives an "aliveness" signal from the vending machine 110, the central server 160 sends an acknowledgement signal to the vending machine 110, thereby confirming to the vending machine 110 that the central server 160 is alive and well. By this means, both the central server 160 and the vending machine 110 can monitor each other and confirm communications integrity.

In various exemplary embodiments, the central server 160 maintains a log of the "aliveness" signal and acknowledgement signal transactions so the central server 160 can determine if a vending machine 110 has stopped transmitting. This information can be accessed, via, for example, an ordinary Web browser 130 from anywhere on the network. Remote monitoring can therefore be achieved, leading to great flexibility in management and troubleshooting of the system 100. In various exemplary embodiments, all monitoring data is encrypted for security purposes.

The central server 160 can also optionally send automatic fault alerts, via, for example, the e-mail server 150 to any valid e-mail client 140 on the network. Within minutes, appropriate service personnel can know when a vending machine 110 has malfunctioned, leading to rapid diagnosis and repair.

In various exemplary embodiments, the central server 160 can enable/disable any vending machine 110 in the system 100 by granting or withholding acknowledgment signals in response to the "aliveness" signals from a particular vending machine 110. For example, a vending machine 110 that appears to be malfunctioning or that shows signs of tampering may be disabled in this way and re-enabled later at the vending provider's discretion. In various exemplary embodiments, this control may be done remotely through any ordinary Web browser 130 from anywhere on the network, making remote management easy and effective. In various exemplary embodiments, all control data is encrypted for security purposes.

Figure 2:
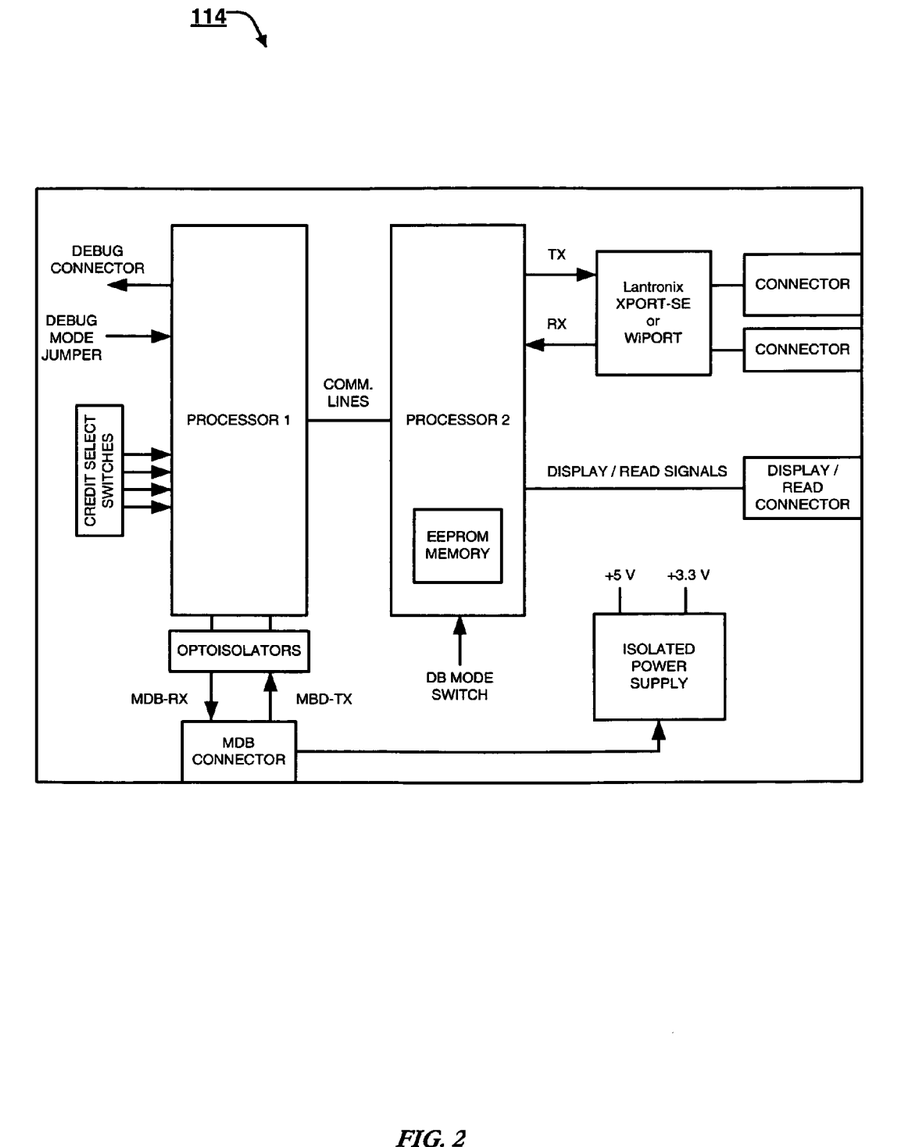
FIG. 2 shows a block diagram of a first exemplary embodiment of a vending machine interface (i.e. a NetVend device) showing the major components and their relationships to each other according to this invention.

FIG. 2 shows a block diagram of a first exemplary embodiment of a vending machine interface (i.e. a NetVend interface 114) showing the major components and their relationships to each other according to this invention. In the various exemplary embodiments described herein, the NetVend interface 114 shown in FIG. 2 is the NetVend interface 114, as described above, with reference to FIG. 1.

It should be appreciated that the NetVend interface 114 links a vending machine controller (VMC) to the rest of the system 100.

The NetVend interface 114 receives power via the MDB connector. In various exemplary embodiments, the power supplied is a nominal +34VDC. The received power is filtered and converted to +5 and +3.3VDC by the isolated power supply, which keeps the vending machine 110 power system isolated from the NetVend interface 114. In various exemplary embodiments, the power supply is fused for safety.

The NetVend operations are controlled by two Microchip PIC Processors, Processor I and Processor II. Each of the Processors contains an embedded program stored in its flash memory. Processor I communicates with the VMC via the MDB connector. In various exemplary embodiments, Processor I implements the Cashless Device #1 (Level 1 implementation) aspect of the MDB/ICP protocol, so any VMC that supports this device is able to communicate with the NetVend interface 114. As recommended by the MDB/ICP 3.0 specifications document, the MDB interface may be optically isolated from the NetVend interface 114 logic by a pair of optoisolators.

Upon startup, Processor I reads data from the credit select switches to determine how much credit should be made available to the VMC for each purchase. In various exemplary embodiments, values from $1 to $15 are possible in $1 increments.

Once the data from the credit select switches has been read and the credit value determined, Processor I awaits a proper MDB initialization sequence from the VMC. Once the proper MDB initialization sequence is received and Processor I is initialized, Processor I signals Processor II that the NetVend interface 114 is ready for cashless vending. Processor II will then accept RFID card scans from the user.

In various exemplary embodiments, Processor I controls vending communications with the VMC by implementing the MDB cashless device state machine as defined in the MDB/ICP 3.0 specifications document. Only actual vending results are passed to Processor II. A debug connector allows a service technician to connect a diagnostic computer to Processor I in order to monitor the MDB bus and its communications. This debugging feature may be turned on or off with the debug mode jumper.

Processor II communicates with the display/reader 116 and the interface 118. It also communicates with Processor I over a set of communications lines that send vend instructions and data and maintain a handshaking protocol between Processor I and Processor II.

Processor II contains an embedded machine ID number stored in its EEPROM memory. This machine ID is included in all communications with the central server 160. All vending machines 110 on the network have a unique ID by which their communications are identified.

Upon startup, Processor II attempts to communicate with the central server 160 over the network as well as with Processor I. If successful, Processor II displays a welcome message on the display/reader 116 that invites cashless vending. If the network or the central server 160 are not reachable, or if Processor I cannot establish a session with the VMC, then Processor II will disable cashless vending and inform the user, via the display/reader 116, that only cash-based vending is possible (assuming that the vending machine 110 has provisions for accepting cash).

In various exemplary embodiments, in order to communicate with the central server 160 through the network, Processor II uses the services of a Lantronix XPORT-SE or WiPORT. The XPORT-SE provides 100/10BASE-T networking and implements the complete TCP/IP protocol. The XPORT-SE also provides AES-128 and AES-256 encryption so all communications are properly secured against packet sniffing and tampering. The WiPORT implements the 802.11 wireless protocol and functions as a wireless equivalent of the XPORT.

Besides encryption, in various exemplary embodiments the NetVend interface 114 protects transaction data by using the non-volatile EEPROM memory located in Processor II as transaction backup storage. If, after a transaction, Processor II cannot successfully transmit the transaction information to the central server 160 (due to network or server failure), Processor II will store the transaction record in the EEPROM memory and disable further cashless transactions. If able to do so, the vending machine 110 will revert to a cash-only mode.

Processor II will then periodically attempt to contact the central server 160 and complete the transaction. Only when the transaction has been sent to and acknowledged by the central server 160 will Processor II re-activate cashless operation. Since the EEPROM memory is non-volatile, the EEPROM memory will retain the transaction record even after a power outage. The first thing Processor II will do after a power outage is attempt to complete the transaction. Only when the transaction has been completed successfully will Processor II re-enable cashless access. This feature significantly reduces the number of lost transactions along with their accompanying loss of income to the vending provider.

The DB mode switch selects between two database formats for transaction data. Format 1 sends only the product value to the central server 160, whereas Format 2 includes the item number along with the product value. In this manner, systems that do not wish to perform inventory management can use Format 1 to eliminate unnecessary data being sent to the central server 160.

Figure 3:
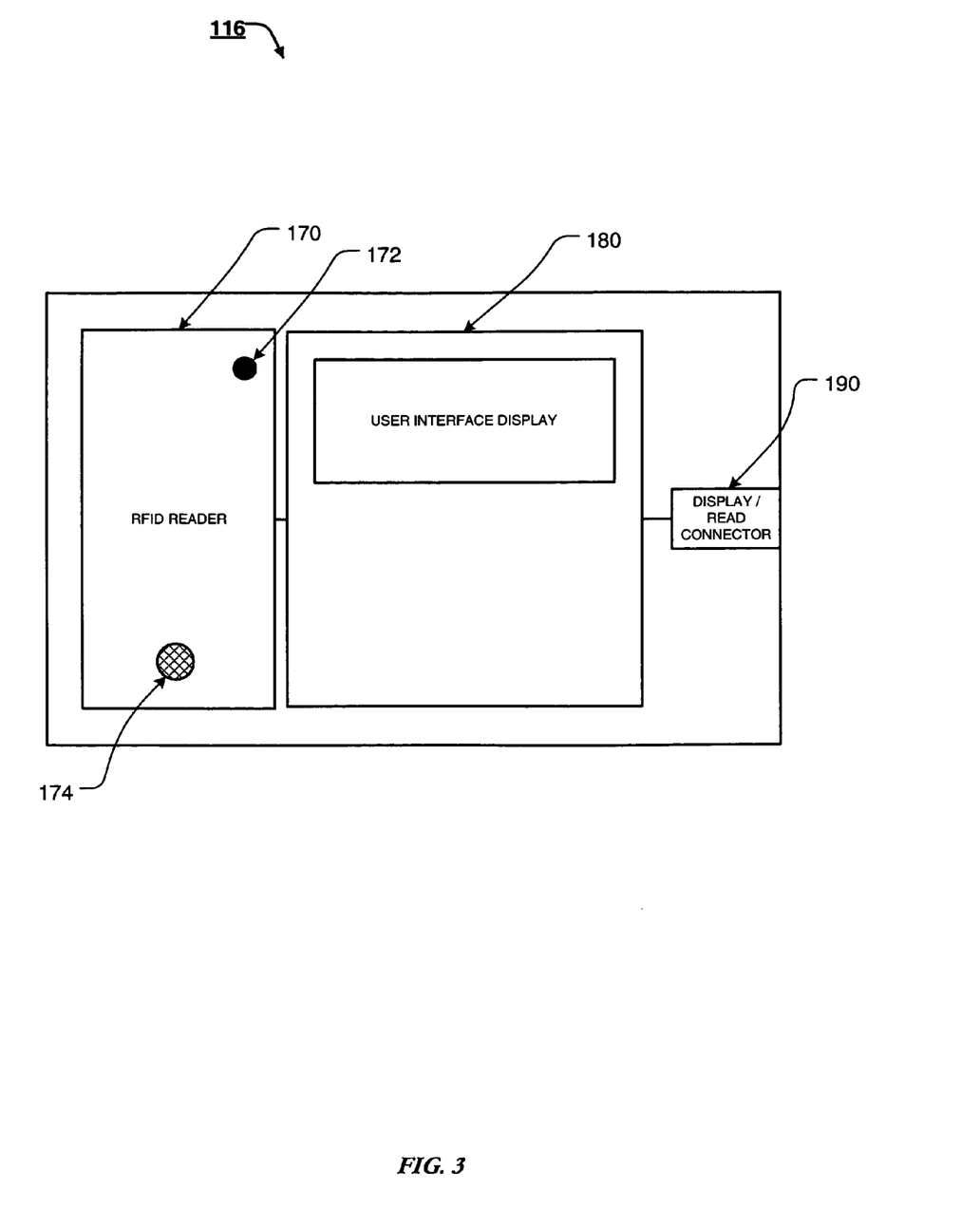
FIG. 3 shows a block diagram of a first exemplary embodiment of a display/reader combination that provides a user interface between a NetVend device and a customer according to this invention.
Figure 4A:
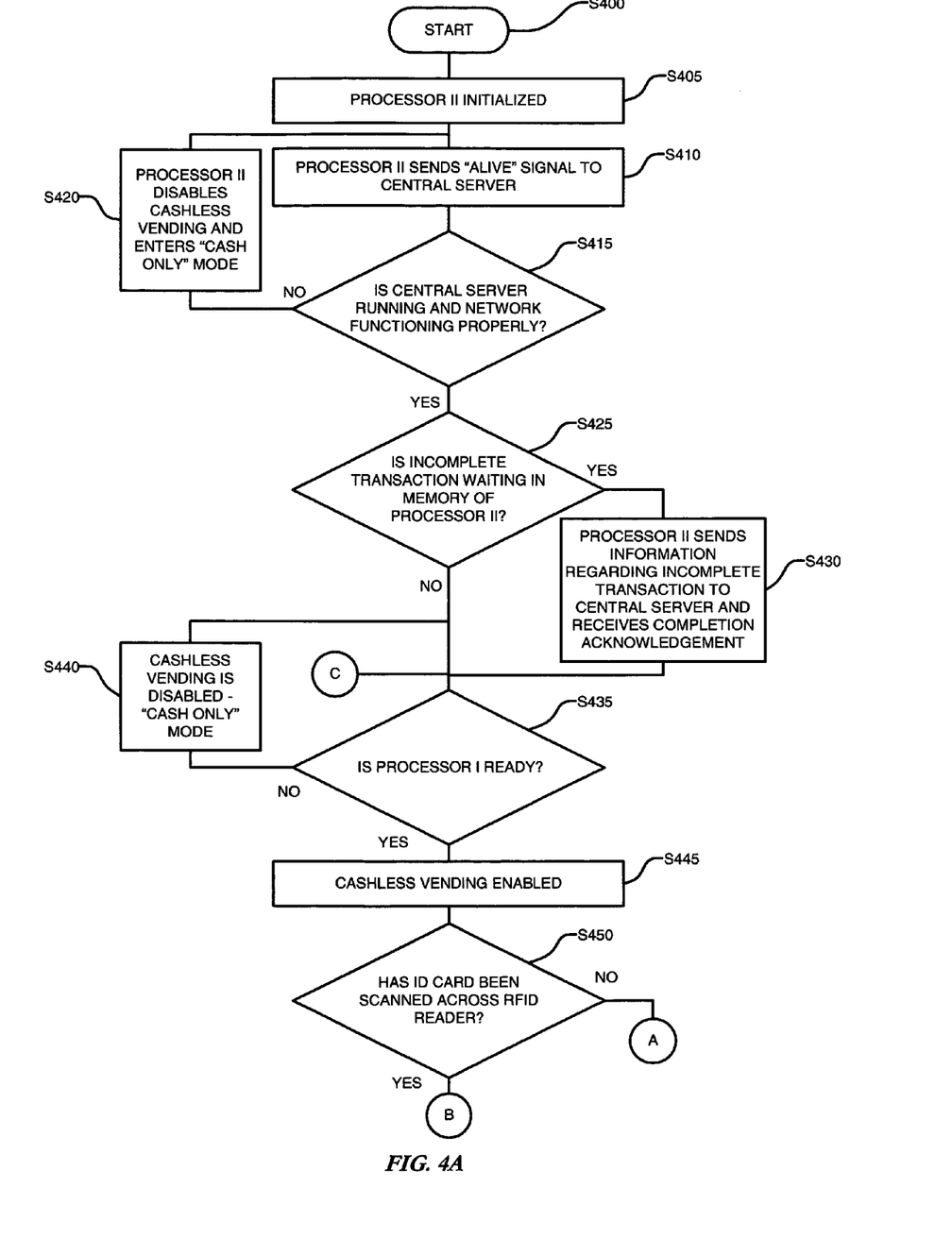
FIGS. 4A-4D show a flowchart outlining an illustrative, non-limiting embodiment of a program that runs in Processor II according to this invention.
Figure 4B:
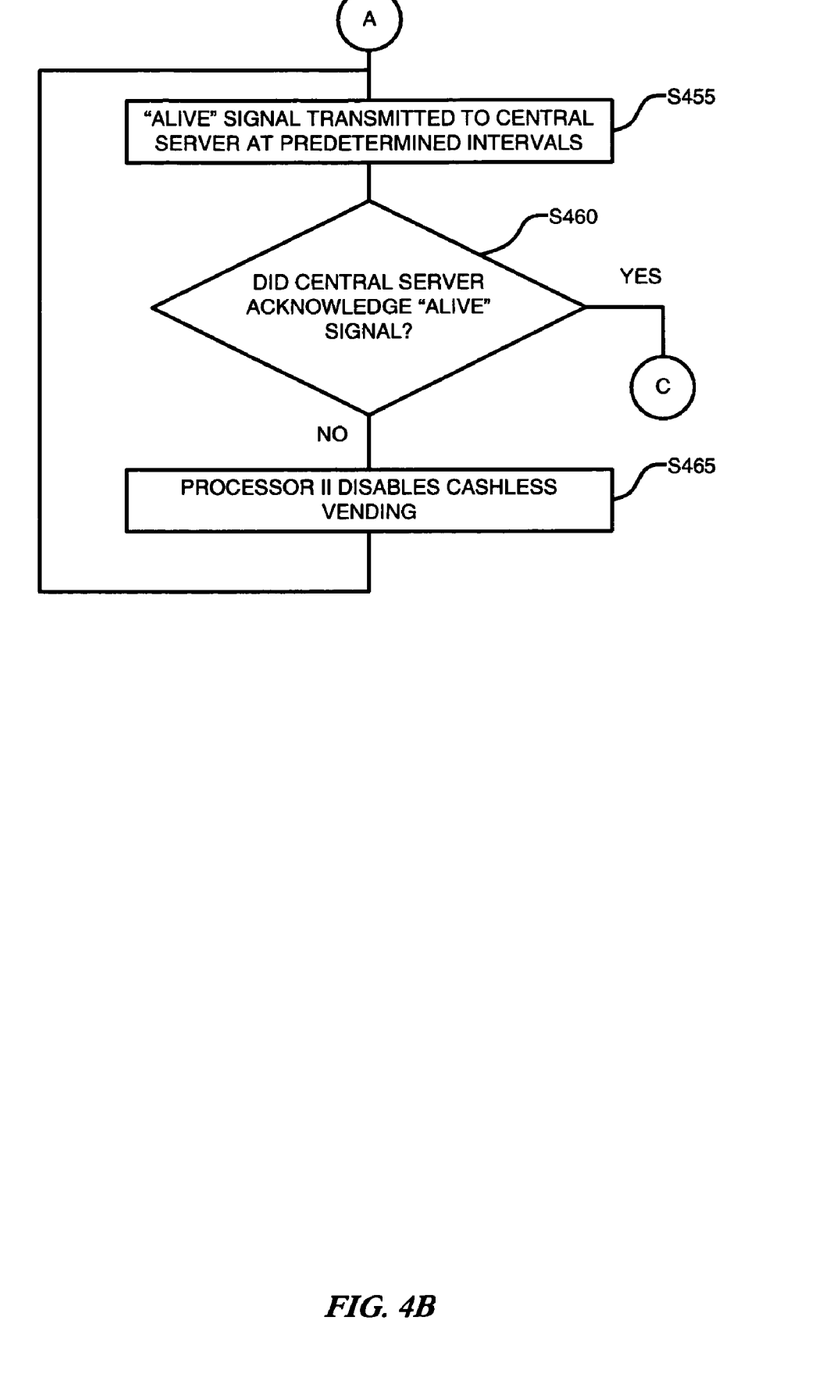
Figure 4C:
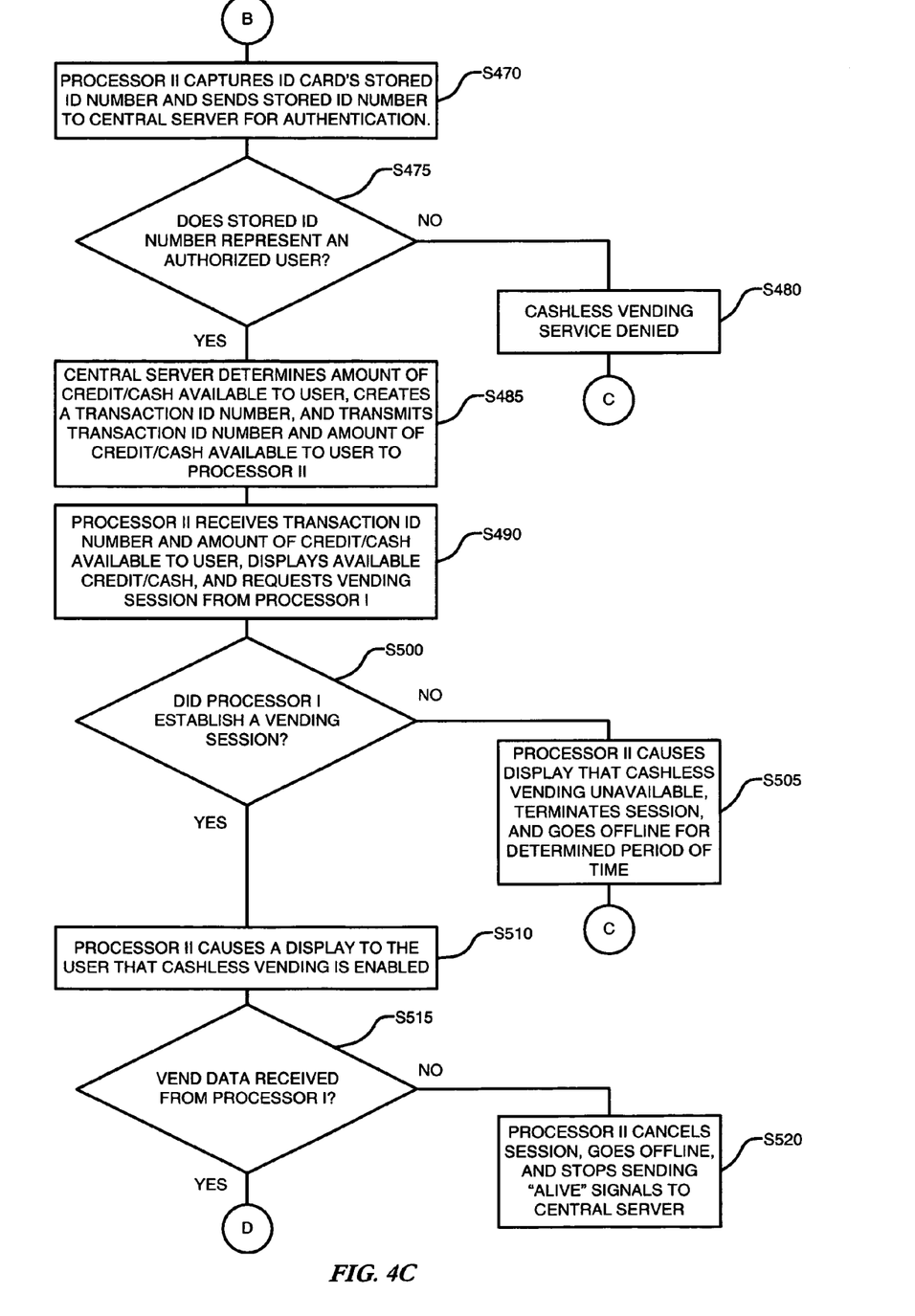
Figure 4D:
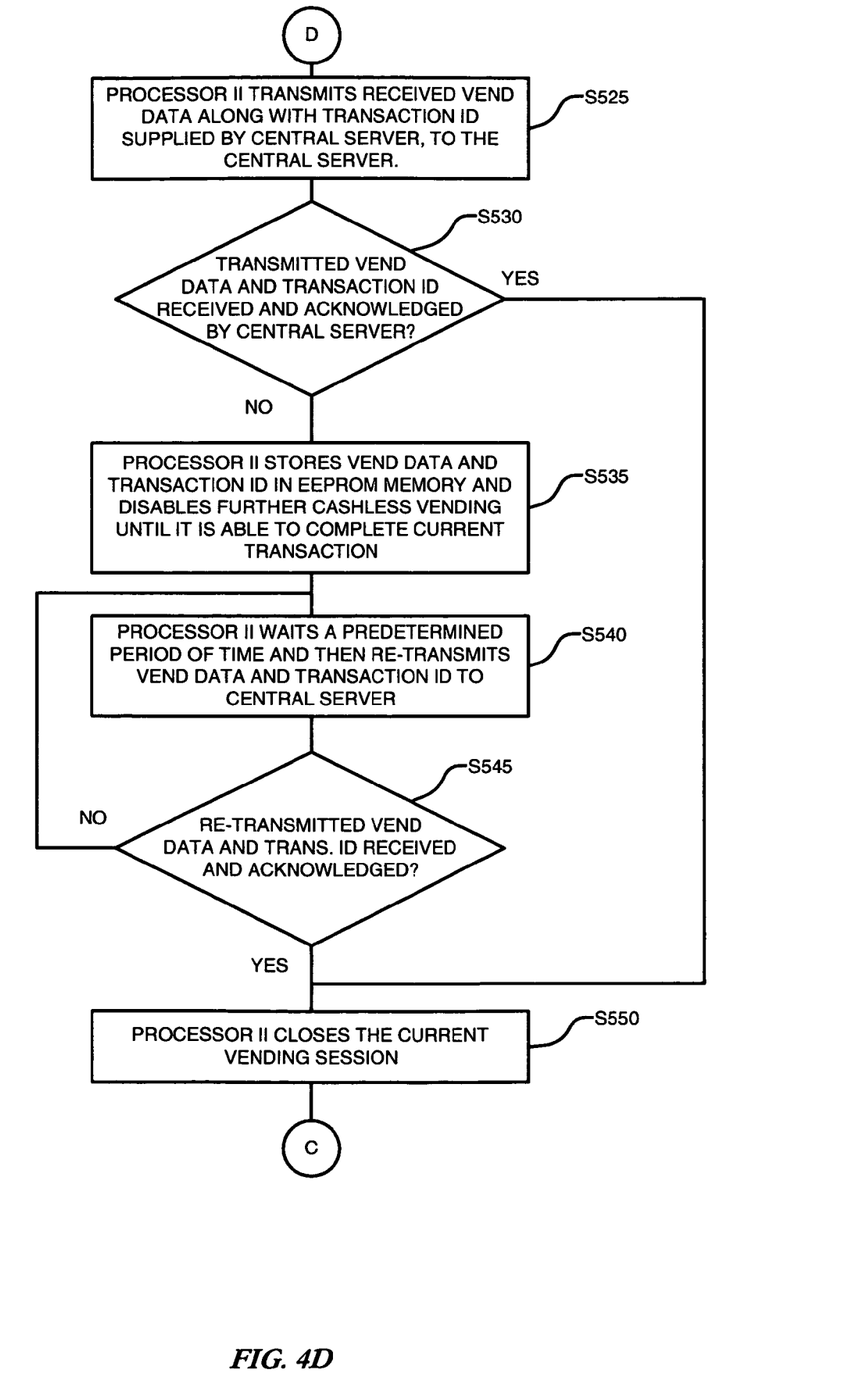

FIG. 3 shows a block diagram of a first exemplary embodiment of a display/reader 116 combination that provides a user interface between a NetVend device and a customer, according to this invention. In the various exemplary embodiments described herein, the display/reader 116 shown in FIG. 3 is the display/reader 116, as described above, with reference to FIG. 1.

The display/reader 116 is mounted on the vending machine 110 and gives a user access to the cashless features of the cashless vending system 100. As shown in FIG. 3, the display/reader 116 includes a RFID card reader 170. The RFID card reader 170 activates and scans the user's RFID card when the RFID card moves into the RF field of the RFID card reader 170.

The RFID card reader 170 then transmits card ID data to the NetVend interface 114, via a display/read connection 190.

A user interface display 180 provides visual instructions and information about the vending process to a user.

In various exemplary embodiments, the display/reader 116 can be a cathode ray tube display, a liquid crystal display, a plasma display, a light emitting diode (LED) display, a printer, or any other known or later developed system capable of displaying data.

In various exemplary embodiments, the visual cues from the user interface display 180 may be supplemented by, for example, a bi-color LED 172 and/or a beeper 174 on the RFID reader.

FIGS. 4A-4D show a flowchart outlining an illustrative, non-limiting embodiment of a program that runs in Processor II according to this invention. As shown in FIGS. 4A-4D, the exemplary program begins in step S400 and continues to Step S405 wherein Processor II is initialized. After Processor II is initialized, the program advances to step S410, wherein Processor II sends an "alive" signal through the XPORT/WiPORT to the central server. This signal both alerts the central server that the vending machine is functioning and lets Processor II verify that the central server is running and that the network is functioning properly.

Next, in step S415, a determination is made as to whether the central server is running and the network is functioning properly. If, in step S415, it is determined that the central server is not running and/or the network is not functioning properly (i.e., the central server fails to acknowledge the "alive" signal), the program advances to step S420 and Processor II disables cashless vending and enters "cash only" mode (if supported by the vending machine). Processor II periodically sends the "alive" signal to the central server to see if it has become accessible.

If, in step S415, it is determined that the central server is running and/or the network is functioning properly (i.e., the central server acknowledges the "alive" signal), the program advances to step S425 wherein Processor II begins to establish or re-establish cashless vending.

Next, in step S425, a determination is made as to whether an incomplete transaction is waiting in the internal EEPROM memory of Processor II. If, in step S425, it is determined that an incomplete transaction is waiting in the internal EEPROM memory of Processor II, the program advances to step S430 and Processor II sends information regarding the incomplete transaction to the central server and waits for an acknowledgement. Only when it successfully completes the old transaction will the program advance to step S435.

If, in step S425, it is determined that no incomplete transactions are waiting in the internal EEPROM memory of Processor II, the program advances to step S435.

In step S435 a determination is made as to whether Processor I is ready. If, in step S435, it is determined that Processor I is not ready (i.e., Processor II does not receive a "ready" signal from Processor I), the program advances to step S440, wherein cashless vending is disabled. Next, the program returns to step S435 to determine whether Processor I is ready.

If, in step S435, it is determined that Processor I is ready (i.e., Processor II receives a "ready" signal from Processor I), the program advances to step S445, wherein cashless vending is enabled.

Then, in step S450, a determination is made as to whether an ID card has been scanned across the RFID reader. If, in step S450, it is determined that an ID card has not been scanned across the RFID reader, the program advances to step S455, wherein an "alive" signal is transmitted to the central server at predetermined intervals. Next, in step S460 a determination is made as to whether the central server acknowledged the "alive" signal. If, in step S460, it is determined that the central server did not acknowledge the "alive" signal, the program advances to step S465 and Processor II disables cashless vending and the program returns to step S455. Similarly, if the central server does not receive an "alive" signal at predetermined intervals, it assumes that the vending machine is down and notifies a technician to service the vending machine.

If, in step S460, it is determined that the central server did acknowledge the "alive" signal, the program returns to step S435.

If, in step S450, it is determined that an ID card has been scanned across the RFID reader, the program jumps to step S470, wherein Processor II captures the ID card's stored ID number and sends the stored ID number to the central server for authentication.

Then, in step S475, a determination is made as to whether the stored ID number represents an authorized user of the cashless vending system. If, in step S475, it is determined that the stored ID number does not represent an authorized user of the cashless vending system, the program advances to step S480, wherein the program denies cashless vending service and returns to step S435.

If, in step S475, it is determined that the stored ID number represents an authorized user of the cashless vending system, the program jumps to step S485, wherein the central server determines the amount of credit/cash available to the user and creates a transaction ID number. The central server then transmits the transaction ID number and the amount of credit/cash available to the user to Processor II and the program advances to step S490.

In step S490, Processor II receives the transaction ID number and the amount of credit/cash available to the user and displays the available credit/cash on the display/reader 116. In step S490, Processor II also requests a vending session from Processor I. The program then advances to step S500.

In step S500, a determination is made as to whether Processor I establishes a vending session. If, in step S500, it is determined that Processor I does not establish a vending session, the program advances to step S505, wherein Processor II causes a display to the user that cashless vending is temporarily unavailable, terminates the session, and goes offline for determined period of time. After the determined period of time has elapsed, the program returns to step S435 and Processor II verifies that Processor I is ready and go back to accepting card scans.

If, in step S500, it is determined that Processor I has established a vending session, the program jumps to step S510, wherein Processor II causes a display to the user that cashless vending is enabled. In various exemplary embodiments, Processor II also causes a display to the user that shows the amount of credit/cash available to the user and invites the user may make a selection. The program then advances to step S515 and awaits a selection by the user.

In step S515, a determination is made as to whether vend data has been received from Processor I. If, in step S515, it is determined that vend data is not received from Processor I within a predetermined period of time, the program advances to step S520 wherein Processor II will cancel the session and go offline.

In various exemplary embodiments, if, in step S515, it is determined that vend data is not received from Processor I within a predetermined period of time, the program advances to step S520 wherein Processor II will cancel the session, go offline permanently, and will discontinue sending "alive" signals to the central server to alert the central server that something has gone wrong. The central server can then notify the appropriate technician to service the vending machine.

If, in step S515, it is determined that vend data is received from Processor I within a predetermined period of time, the program jumps to step S525 wherein Processor II transmits the received vend data along with the transaction ID supplied by the central server, to the central server.

Then, in step S530, a determination is made as to whether the vend data and transaction ID transmitted in step S525 was received and acknowledged by the central server. If, in step S530, it is determined that the vend data and transaction ID was not received and acknowledged by the central server, the program advances to step S535, wherein Processor II stores the vend data and transaction ID in the EEPROM memory and disables further cashless vending until it is able to complete its transaction. Then, in step S540, Processor II waits a predetermined period of time and then re-transmits the vend data and the transaction ID to the central server.

Then, in step S545, a determination is made as to whether the re-transmitted vend data and the transaction ID was received and acknowledged by the central server. If, in step S545, it is determined that the re-transmitted vend data and the transaction ID was not received and acknowledged by the central server, the program returns to step S540, wherein Processor II continues trying to complete the transaction at a predetermined time interval until it successfully completes the transaction.

If, in step S530, it is determined that the vend data and transaction ID was received and properly acknowledged by the central server, the program jumps to step S550, wherein Processor II closes the current vending session and the program returns to step S435 and readies for another transaction.

Figure 5A:
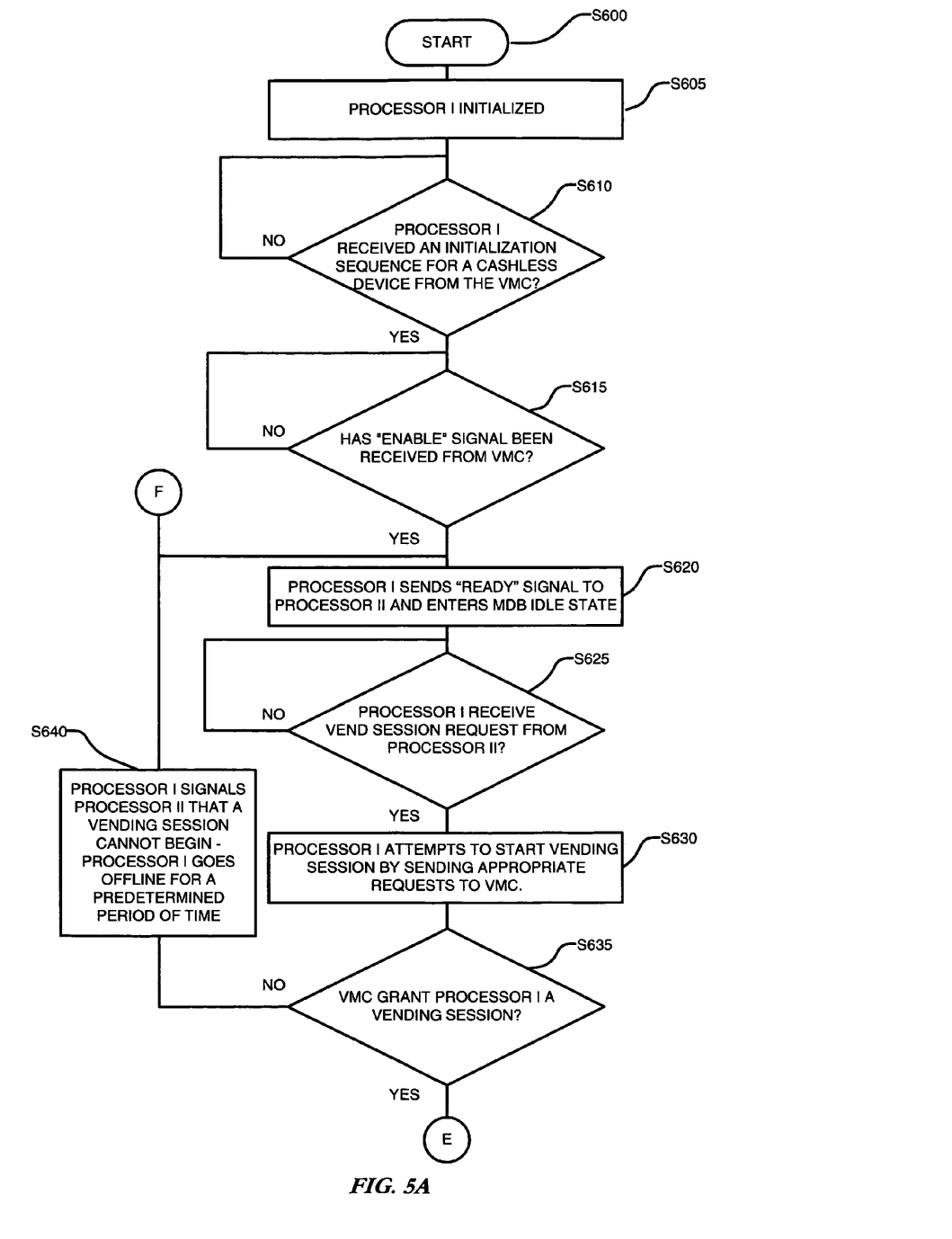
FIGS. 5A-5B show a flowchart outlining an illustrative, non-limiting embodiment of a program that runs in Processor I according to this invention.
Figure 5B:
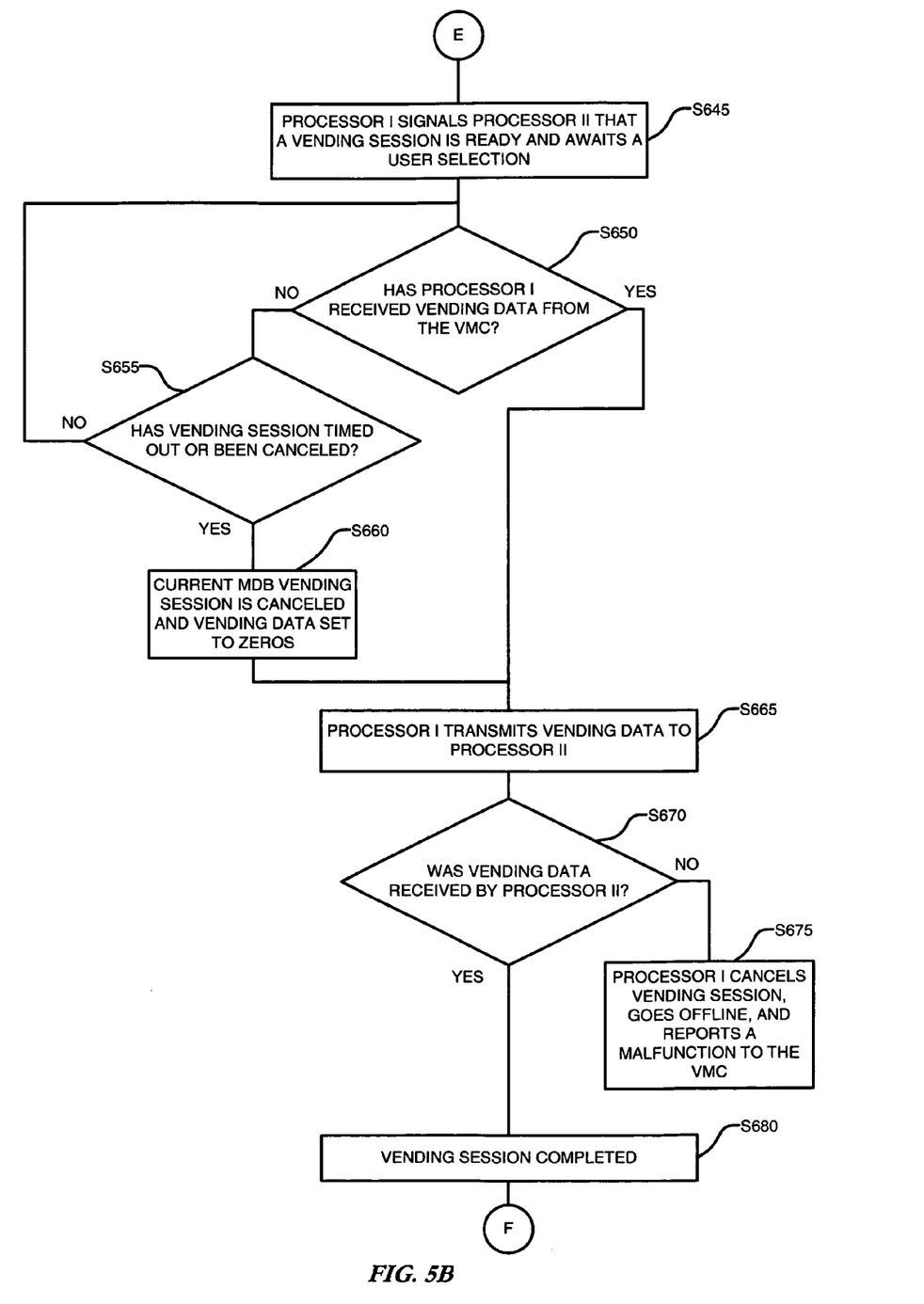

FIGS. 5A-5B a flowchart outlining an illustrative, non-limiting embodiment of a program that runs in Processor II according to this invention. As shown in FIGS. 5A-5B, the exemplary program begins in step S600 and continues to Step S605 wherein Processor II is initialized. After Processor II is initialized, the program advances to step S610, wherein a determination is made as to whether Processor II has received an initialization sequence for a Cashless Device #1 MDB peripheral (as defined in the MDB/ICP 3.0 specifications document) is received from the VMC. If, in step S610, it is determined that an initialization sequence has not been received from the VMC, the program returns to step S610.

If, in step S610, it is determined that an initialization sequence has been received from the VMC, the program advances to step S615, wherein Processor I completes the initialization sequence and a determination is made as to whether an "enable" signal is received by Processor I from the VMC. The "enable" signal permits the vending machine to go online and join the other MDB devices on the bus. If, in step S615, it is determined that an "enable" signal has not been received from the VMC, Processor I signals Processor II that it is not ready, thereby effectively disabling cashless access to the vending machine, and the program returns to step S615.

If, in step S615, it is determined that an "enable" signal has been received from the VMC, the program advances to step S620, wherein Processor I sends Processor II a "ready" signal and enters the MDB IDLE state in which Processor I responds to VMC polls and waits for Processor II to request a vending session.

Then, in step S625, a determination is made as to whether Processor I receives a vend session request from Processor II. If, in step S625, it is determined that Processor I has not received a vend session request from Processor II, the program returns to step S625.

If, in step S625, it is determined that Processor I has received a vend session request from Processor II, the program advances to step S630, wherein Processor I attempts to start a vending session by sending the appropriate requests to the VMC.

Then, in step S635, a determination is made as to whether the VMC grants Processor I a vending session. If, in step S635, it is determined that the VMC has not granted Processor I a vending session, the program advances to step S640, wherein Processor signals Processor II that a vending session cannot begin and Processor I then goes offline for a predetermined period of time before returning to step S620.

If, in step S635, it is determined that the VMC has granted Processor I a vending session, the program jumps to step S645, wherein Processor I signals Processor II that a vending session is ready and awaits the user to make a selection.

Next, in step S650, a determination is made as to whether Processor I has received vending data from the VMC. If, in step S650, it is determined that Processor I has not received vending data from the VMC, the program advances to step S655 and a determination is made as to whether the vending session has timed out or been canceled. For example, the user may opt to cancel the current vending session by pressing the vending machine's COIN RETURN button or by waiting until the current vending session times out (typically thirty seconds).

If, in step S655, it is determined that the current vending session has not timed out or been canceled, the program returns to step S650. Otherwise, if, in step S655, it is determined that the current vending session has timed out or been canceled, the program advances to step S660 and the current MDB vending session is canceled. Once the MDB vending session is canceled, the program advances to step S665 and Processor I treats a canceled or timed-out vending session as a successful vend and transmits zeroes to Processor II.

If, in step S650, it is determined that Processor I has received vending data from the VMC, the program advances to step S665 and Processor I transmits data regarding the vend to Processor II. The program then advances to step S670.

In step S670, a determination is made as to whether the vend data transmitted in Step S665 was received by Processor II. If, in step S670, it is determined that vend data has not been received by Processor II within a predetermined period of time, the program advances to step S675 wherein Processor I will cancel the session, go offline, and report a malfunction to the VMC, effectively disabling further cashless activity. Processor II will detect the offline status of Processor I and notify the central server of the fault by discontinuing transmission of "alive" signals at regular intervals.

If, in step S670, it is determined that vend data has been received by Processor II within a predetermined period of time, the program advances to step S680 wherein the program returns to step S620.

While this invention has been described in conjunction with the exemplary embodiments outlined above, it is evident that many alternatives, modifications, and variations will be apparent to those skilled in the art. Such adaptations and modifications should and are intended to be comprehended within the meaning and range of equivalents of the disclosed exemplary embodiments.

It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. A method for permitting a cashless vend from a cashless vending system, comprising:

allowing a user's Radio Frequency Identification card to be scanned by a display/reader of a vending machine, wherein a reader portion of the display/reader is capable of scanning the user's Radio Frequency Identification card and wherein a display portion of the display/reader is capable of displaying information to the user, wherein the vending machine comprises a Vending Machine Controller that supports an international Multi-Drop Bus/Internal Communication Protocol standard, wherein the vending machine includes a NetVend interface that communicates, via a Multi-Drop Bus/Internal Communication Protocol interface, with the Vending Machine Controller, wherein the NetVend interface contains an embedded machine ID number that uniquely identifies the vending machine, and wherein the NetVend interface contains a nonvolatile memory for storage of vending data;

allowing the user's RFID number to be determined by the NetVend interface associated with the vending machine;

allowing the NetVend interface associated with the vending machine to contact a central server by transmitting the user's RFID number to the central server, wherein the central server contains a database for storing user Identifiers and an associated allowable credit or available cash data for the user Identifier, wherein the central server is capable of authenticating users for granting/denying access to a vending machine, receiving transaction data, and monitoring and controlling a plurality of vending machines;

receiving, in the central server, the transmitted user's RFID number;

accessing, in response to the receipt of the transmitted user's RFID number, the database for storing user Identifiers;

determining, based on information in the database, an allowable credit or available cash amount associated with the received user's RFID number;

transmitting, if the allowable credit or available cash amount is above a predetermined amount, an allowable credit or available cash amount associated with the received user's RFID number and a transaction ID number to the NetVend interface associated with the vending machine;

receiving, in the NetVend interface associated with the vending machine, the transmitted allowable credit or available cash amount and the transaction ID number;

allowing the allowable credit or available cash amount to be displayed for the user by the vending machine;

allowing the user to make a selection from items available in the vending machine;

allowing the NetVend interface to determine transaction/vend data associated with the user's vending machine selection;

allowing the NetVend interface to transmit the determined transaction/vend data associated with the user's vending machine selection and the transaction ID number to the central server;

receiving, in the central server, the determined transaction/vend data and the transaction ID number;

transmitting, from the central server, in response to receipt of the determined transaction/vend data and the transaction ID number, an acknowledgement to the vending machine;

receiving, in the vending machine, the acknowledgement from the central server; and allowing, in response to receipt of the acknowledgement from the central server, the vending machine to permit the cashless vend.

2. The method of claim 1, wherein the transaction/vend data comprises at least some of the vending machine ID, the transaction ID, a selection value, and an item number for the selection item.

* * * * *